(12) United States Patent
Korotin

(10) Patent No.: US 7,512,136 B2
(45) Date of Patent: Mar. 31, 2009

(54) APPARATUS AND METHOD FOR PRESERVING ROUTABLE IP ADDRESSES USING ARP PROXY

(75) Inventor: Dmitry O. Korotin, Fremont, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1034 days.

(21) Appl. No.: 10/295,431

(22) Filed: Nov. 15, 2002

(65) Prior Publication Data

US 2004/0095943 A1 May 20, 2004

(51) Int. Cl.
*H04L 12/28* (2006.01)
*H04L 12/56* (2006.01)

(52) U.S. Cl. .................. 370/401; 370/352; 370/353; 370/466; 370/469; 370/389

(58) Field of Classification Search ............... 370/352, 370/401, 466, 353, 389, 469, 403–406, 408, 370/355, 315, 356, 351, 400, 432, 255, 465–468, 370/349, 219, 312; 709/236, 238, 245, 223, 709/220, 226, 227, 249, 242, 228, 222
See application file for complete search history.

(56) References Cited

U.S. PATENT DOCUMENTS

| | | | | |
|---|---|---|---|---|
| 6,047,325 A * | 4/2000 | Jain et al. | ................... | 709/227 |
| 6,189,042 B1 * | 2/2001 | Keller-Tuberg | ............. | 709/238 |
| 6,603,769 B1 * | 8/2003 | Thubert et al. | ............... | 370/401 |
| 6,701,361 B1 * | 3/2004 | Meier | .......................... | 709/224 |
| 6,822,955 B1 * | 11/2004 | Brothers et al. | ............. | 370/389 |
| 6,870,840 B1 * | 3/2005 | Hill et al. | .................... | 370/389 |
| 6,895,443 B2 * | 5/2005 | Aiken | ......................... | 709/245 |
| 7,020,157 B2 * | 3/2006 | Koch et al. | ................... | 370/463 |
| 7,088,739 B2 * | 8/2006 | DeMars et al. | .............. | 370/476 |
| 7,159,035 B2 * | 1/2007 | Garcia-Luna-Aceves et al. | .......................... | 709/241 |
| 7,185,106 B1 * | 2/2007 | Moberg et al. | .............. | 709/238 |
| 2002/0021689 A1 * | 2/2002 | Robbins et al. | ............. | 370/352 |
| 2002/0052972 A1 * | 5/2002 | Yim | .......................... | 709/245 |
| 2002/0154644 A1 * | 10/2002 | Lindemann et al. | ......... | 370/401 |
| 2003/0028668 A1 * | 2/2003 | Garcia-Luna-Aceves et al. | .......................... | 709/238 |
| 2003/0037163 A1 * | 2/2003 | Kitada et al. | ................ | 709/236 |
| 2003/0037167 A1 * | 2/2003 | Garcia-Luna-Aceves et al. | .......................... | 709/238 |
| 2003/0088700 A1 * | 5/2003 | Aiken | ......................... | 709/245 |
| 2004/0054799 A1 * | 3/2004 | Meier et al. | ................. | 709/230 |
| 2004/0213234 A1 * | 10/2004 | Koch et al. | ................... | 370/392 |
| 2005/0018681 A1 * | 1/2005 | Koch et al. | ................... | 370/392 |
| 2005/0025129 A1 * | 2/2005 | Meier | ......................... | 370/352 |

* cited by examiner

*Primary Examiner*—Edan Orgad
*Assistant Examiner*—Chuong Ho

(57) ABSTRACT

An Address Resolution Protocol (ARP) request is received at a gateway coupled to a first local network from a first host also coupled to the first local network. The ARP request includes a destination IP address of a second host coupled to a second local network. Also, a source IP address of the first host and the destination IP address are within the same IP address sub-network. A local network address of the gateway is then sent to the first host in reply to the ARP request, based on an entry for the destination IP address in an ARP proxy table stored on the gateway. A packet is subsequently acquired from the first host addressed to the second host. The packet's header includes the source IP address and the destination IP address. Finally the packet is transmitted toward the second host.

21 Claims, 7 Drawing Sheets

APPARATUS AND METHOD FOR PRESERVING ROUTABLE IP ADDRESSES USING ARP PROXY

BACKGROUND OF THE INVENTION

1. Field of the Invention

The present invention relates generally to computer networking, and more particularly to an apparatus and method for preserving routable IP addresses using Address Resolution Protocol (ARP) proxy.

2. Description of Related Art

With the proliferation of consumer Internet access and Web-sites, the demand for Internet addresses, or Internet Protocol (IP) addresses, has skyrocketed. The predominant protocol in use today, IP version 4 (IPv4) [see RFC-791], provides approximately four billion public IP addresses. Although this seems like more than enough IP addresses, the US Census Bureau predicts that by 2050 the world will be home to about 9 billion people. What is more, each person will probably have more than one networked device, each of which will require its own IP address.

This demand for Internet addresses has resulted in the need for preserving IP addresses. In fact, IP address preservation is one of the many challenges facing Internet Service Providers (ISPs) and Web hosting facilities today. Additionally, each individual IP address has an associated cost per year.

One solution to preserving IP addresses is the successor to IPv4, namely IPv6, which will provide for 128-bit long addresses, which translates to an unthinkable 340 trillion, trillion, trillion (3.4×1038) addresses. Until such time that IPv6 is fully implemented, ISPs and Web-hosting facilities need to preserve IP addresses.

Another solution, is to host multiple Web-sites from a single IP address by using Web servers such as MICROSOFT IIS™ or APACHE™. Such Web servers give each Web-site its own "document root" with a unique home page. This approach works well for hosting a moderate number of small sites, but becomes burdensome as Web-sites grow from a shared-hosting environment to needing their own server to meet customer demands.

The current use of routable IP addresses will now be explained. FIG. 1 is a block diagram of an existing system 100 for connecting multiple hosts, such as first host 102 and second host 116, to one another. Each host 102 or 116 is typically a desktop computer. The hosts 102 and 116 are coupled to one another through gateways, such as first gateway 106 and second gateway 112, coupled to the Internet 110. Gateways 106 or 112 are any bi-directional Internet Protocol (IP) communication devices that couple to the Internet 110 via communication links 108. Such gateways include analog "dial-up" modems, DSL gateways, cable modems, or the like.

The first host 102 couples to the first gateway 106 via a first local network, such as a first Local Area Network (LAN) 104. Similarly, the second host 116 couples to the second gateway 112 via a second local network, such as an second Local Area Network (LAN) 114. The first LAN and second LANs are typically Ethernet networks, where Ethernet is well understood in the art to be the most widely used LAN access method, defined by the Institute of Electrical and Electronics Engineers (IEEE) as the 802.3 standard.

Packets routed from one host to another are routed using the Transmission Control Protocol/Internet Protocol (TCP/IP) communications protocol. For example, the first host 102, having an IP address and sub-network (hereinafter "subnet") mask of 64.1.1.5/30, addresses a packet to the second host 116 having an IP address and subnet mask of 64.1.1.9/30. Because the second host 116 is not on the same local network as the first host 102, the first host consults its routing table to determine where to send the packet. The first host's routing table informs the first host to send the packet to its Default Gateway (D.G.), which in this case is the IP address and subnet mask of 64.1.1.6/30. A Default Gateway is the router entry used to forward all traffic that is not addressed to a host within the local network. However, a Default Gateway is not to be confused with the gateways 106 and 116. In accordance with its routing table, the first host 102 then sends the packet to the IP address and sub-network mask of 64.1.1.6/30, which is the IP address and sub-network mask of the first gateway 106.

The first gateway 106 receives the packet and consults its own routing table to ascertain where next to send the packet. The first gateway's routing table instructs the first gateway 106 to send the packet to its Default Gateway, which is in this case the Internet 110. In accordance with its routing table, the first gateway then sends the packet to the Internet 100.

As is well understood by those skilled in the art, the packet is subsequently routed through the Internet 110 to the second gateway 112. The second gateway 112 receives the packet and consults its routing table to determine where to send the packet. The second gateway's routing table instructs the second gateway 112 to send any packets addressed to the network of 64.1.1.9/30 to the second LAN 114 (LN2). In accordance with its routing table, the second gateway then forwards the packet to the second LAN 114, whereafter the second host 116 receives the packet from the second LAN 114. Likewise, the process for transmitting packets from the second host 116 to the first host 102 is similar to that described above.

As can be seen from the description above, a separate routable IP address is needed for each host and each gateway, where a routable IP address is any address that can be "seen" and accessed from the outside world, i.e., the Internet. However, to allow each host-gateway combination to communicate between one another, the IP addresses for each host-gateway combination must be on the same local network. For example, the IP address and subnet mask of the first host, i.e., 64.1.1.5/30, and the IP address and subnet mask of the first gateway, i.e., 64.1.1.6/30, are directly coupled to the first local network, as this subnet mask of /30 includes the four IP addresses of 64.1.1.4, 64.1.1.5, 64.1.1.6, and 64.1.1.7. In other words, a minimum of two routable IP addresses on the same local network are needed for each host and gateway combination. However, to obtain two IP addresses, a minimum of four IP addresses must be assigned to each local network. This is because subnet masks can only divide into networks having a set group of IP addresses in each sub-network. These groups of IP addresses are dictated by the subnet mask, as indicated below.

| SUBNET MASK | SHORTHAND | | NUMBER OF ADDRESSES | |
|---|---|---|---|---|
| 255.255.255.0 | /24 [8-bit] | $2^8 =$ | 256 | = 254 hosts + 1 bcast + 1 net base |
| 255.255.255.128 | /25 [7-bit] | $2^7 =$ | 128 | = 126 hosts + 1 bcast + 1 net base |

-continued

| SUBNET MASK | SHORTHAND | | NUMBER OF ADDRESSES | |
|---|---|---|---|---|
| 255.255.255.192 | /26 [6-bit] | $2^6 =$ | 64 | = 62 hosts + 1 bcast + 1 net base |
| 255.255.255.224 | /27 [5-bit] | $2^5 =$ | 32 | = 30 hosts + 1 bcast + 1 net base |
| 255.255.255.240 | /28 [4-bit] | $2^4 =$ | 16 | = 14 hosts + 1 bcast + 1 net base |
| 255.255.255.248 | /29 [3-bit] | $2^3 =$ | 8 | = 6 hosts + 1 bcast + 1 net base |
| 255.255.255.252 | /30 [2-bit] | $2^2 =$ | 4 | = 2 hosts + 1 bcast + 1 net base |
| 255.255.255.254 | /31 [1-bit] | $2^1 =$ | — | invalid (no possible hosts) |
| 255.255.255.255 | /32 [0-bit] | $2^0 =$ | 1 | a host route |

Therefore, in use, to obtain two routable IP addresses, a sub-network having a minimum of four routable IP addresses must be assigned to each local network. Unfortunately, this wastes valuable routable IP addresses. Also, as each IP address has an associated cost, the wasted IP addresses are an unnecessary cost to the ISP and/or consumer.

In light of the above, it would be highly desirable to provide an apparatus and method for preserving IP addresses.

BRIEF SUMMARY OF THE INVENTION

According to the invention there is provided a method for preserving Internet Protocol (IP) addresses. An Address Resolution Protocol (ARP) request is received at a gateway coupled to a first local network from a first host also coupled to the first local network. The ARP request includes a destination IP address of a second host coupled to a second local network. Also, a source IP address of the first host and the destination IP address are within the same IP address sub-network. For example, a source IP address of 64.1.1.1/24 and a destination IP address of 64.1.1.2/24 are within the same sub-network.

A local network address of the gateway is then sent to the first host in reply to the ARP request, based on an entry for the destination IP address in an ARP proxy table stored on the gateway. A packet is subsequently acquired from the first host addressed to the second host. The packet's header includes the source IP address and the destination IP address. Finally the packet is transmitted toward the second host.

In a preferred embodiment, the packet is sent to a Default Gateway of the gateway based on a entry for the destination IP address in a routing table stored on the gateway. The Default Gateway is preferably the Internet. Alternatively, the packet is transmitted to a third host coupled to a third local network based on a entry for the destination IP address in a routing table stored on the gateway. In this embodiment, the gateway is also coupled to the third local network, and again the source IP address and the destination IP address are within the same IP address sub-network.

Still further, according to the invention there is provided a gateway for preserving Internet Protocol (IP) addresses. The gateway comprises a Central Processing Unit (CPU); communications circuitry coupled to a first local network and the Internet, where the communications circuitry has a unique local network address; at least two ports for communicating with the first local network and the Internet; and a memory. The memory comprises an operating system; a Address Resolution Protocol (ARP) table; a routing table; and communication procedures. The ARP table contains a list of destination IP addresses and associated instructions for sending the local network address to a first host also coupled to the first local network The first host has a source IP address. The routing table contains a list of destination IP addresses and associated instructions for routing packets to one of the ports. The communication procedures comprise instructions for receiving an ARP request from the first host. The ARP request includes a destination IP address of a second host coupled to a second local network. Also, the source IP address and the destination IP address are within the same IP address sub-network. The communication procedures also comprise instructions for sending the local network address to the first host in reply to the ARP request, based on an entry for the destination IP address in the ARP proxy table. The communication procedures further include instructions for receiving a packet from the first host addressed to the second host. The packet includes the source IP address and the destination IP address. Finally, the communication procedures include instructions for transmitting the packet toward the second host.

A system for preserving Internet Protocol (IP) addresses is also provided. The system includes a first host having a source IP address and coupled to a first gateway via a first local network. The system also includes a second host having a destination IP address and coupled to a second gateway via a second local network. Finally the system includes the Internet coupled to both the first gateway and the second gateway. The gateway includes components are described above.

Finally, a computer program product for preserving Internet Protocol (IP) addresses is provided. The computer program product comprises a computer readable storage and a computer program stored therein. The computer program comprises instructions and procedures as described above.

In this way, routable IP addresses on the same network can be assigned to hosts and gateways on separate and distinct local networks, thereby preserving IP addresses and reducing waste. Therefore, a single routable IP address can be given to each host and gateway without having to assign a minimum of four routable IP addresses to each local network.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 1:
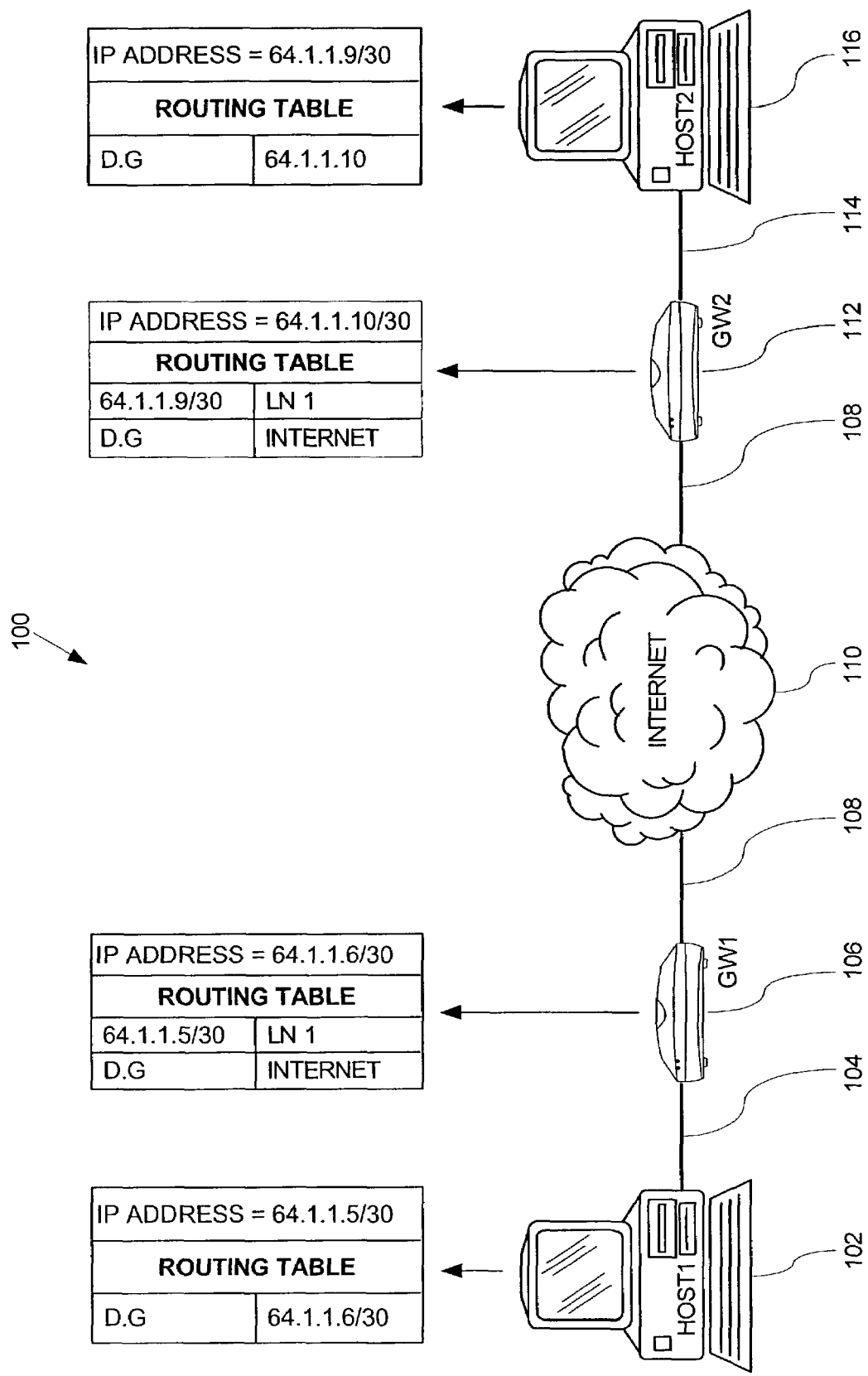
FIG. 1 is a block diagram of an existing system for connecting multiple hosts to one another.
Figure 2:
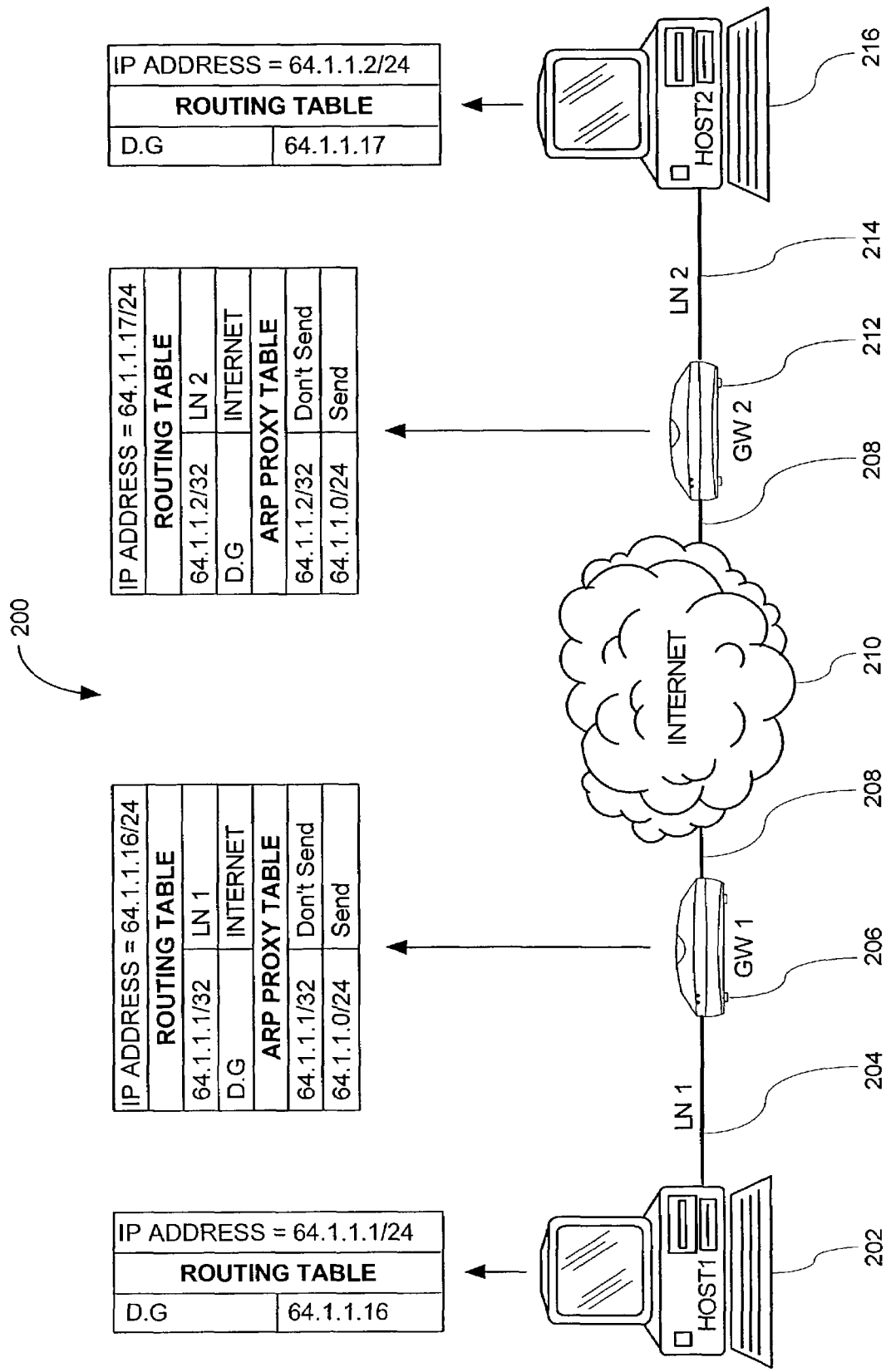
FIG. 2 is a block diagram of a system for preserving routable IP addresses using ARP proxy, according to an embodiment of the invention.

FIG. 2 is a block diagram of a system 200 for preserving routable IP addresses using ARP proxy, according to an embodiment of the invention. The system 200 connects multiple hosts, such as a first host 202 and a second host 216, to one another. The hosts 202 or 216 may be any type of computing device that is capable of communicating over a network, such as desktop computers, or the like.

As is well understood in the art, the hosts 202 and 216 preferably include standard components, such as at least one data processor or central processing unit (CPU); a memory; communications circuitry, such as a Network Interface Card (NIC); user interface devices, such as a monitor and keyboard; and at least one bus that interconnects these components. The communications circuitry preferably includes a unique local network address, such as a Ethernet address or Media Access Control (MAC) address. The memory preferably includes an operating system, such as MICROSOFT WINDOWS™ or MAC OS™, having instructions for communicating, processing, accessing, storing, or searching data, etc. The memory also preferably includes communication procedures; network access procedures, such as MICROSOFT'S™ INTERNET EXPLORER™ or NETSCAPE'S™ NAVIGATOR™; and an Address Resolution Protocol (ARP) table. What is more, the memory includes a unique routable IP address and routing table as shown in FIG. 2.

The first host 202 is coupled to a first gateway 206 via a first local network 204, while the second host 216 is coupled to a second gateway 212 via a second local network 214. The first and second local networks 204 and 214 are preferably Local Area Networks (LANs) that communicate using Ethernet. As described above, Ethernet is the most widely used LAN access method, and is defined by the Institute of Electrical and Electronics Engineers (IEEE) as the 802.3 standard. These first and second local networks may be wired or wireless networks, such as that defined by the IEEE 802.11b standard.

The first and second gateways 206 and 212 are any bi-directional Internet Protocol (IP) communication devices that couple to the Internet 210 via communication links 208. Such Bi-directional IP communication devices include, analog "dial-up" modems, Digital Subscriber Line (DSL) gateways, cable modems, or the like. Communication links 208 include any type of communication link or network, such as Digital Subscriber Line (DSL) networks, cable networks, Asynchronous Transfer Mode (ATM) networks, wireless networks, or the like.

In addition, packets routed from one host to another are routed through the Internet, and, therefore, the hosts communicate using the Transmission Control Protocol/Internet Protocol (TCP/IP) communications protocol, as is well understood by those skilled in the art.

Figure 3:
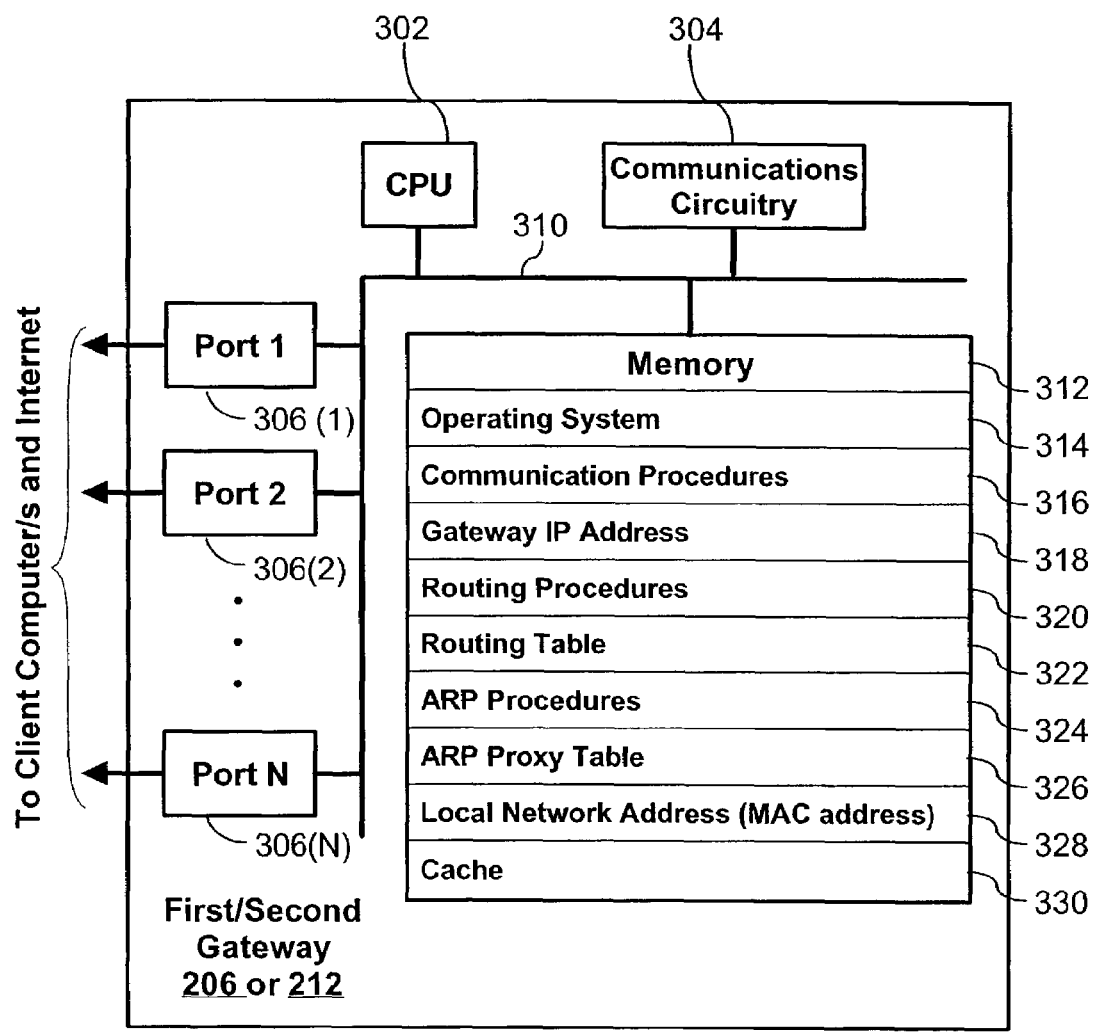
FIG. 3 is a block diagram of either of the gateways shown in FIG. 2.

FIG. 3 is a block diagram of either of the gateways 206 or 212 shown in FIG. 2. Gateways 206 or 212 preferably include components, such as at least one data processor or central processing unit (CPU) 302; a memory 312; communications circuitry 304, such as a Network Interface Card (NIC); communications ports 306(1)-(N) that couple to host 202 or 216 (FIG. 2) and to the Internet 210 (FIG. 2); and at least one bus 310 that interconnects these components. The memory 312 preferably includes an operating system 314, such as VXWORKS™, or IMBEDDED LINUX™, having instructions for communicating, processing, accessing, storing, or searching data, etc. The memory 312 also preferably includes communication procedures 316; a gateway IP address 318 (also shown in FIGS. 2, 5, or 6); routing procedures 320; a routing table 322 (also shown in FIGS. 2, 5, or 6); Address Resolution Protocol (ARP) procedures 324; an ARP proxy table 326 (also shown in FIGS. 2, 5, or 6); a local network address (MAC address) 328; and a cache 330 for temporarily storing data.

Figure 5:
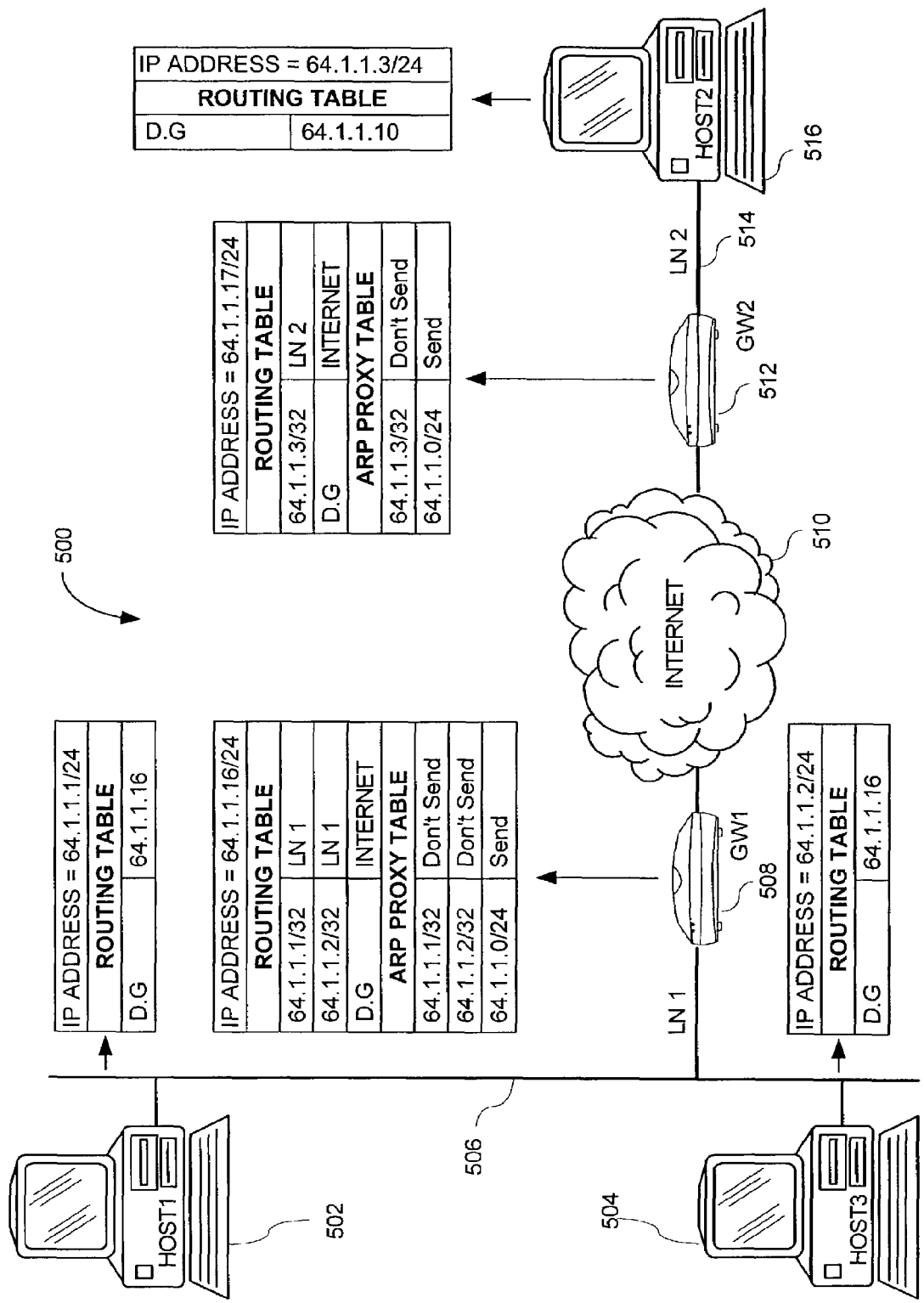
FIG. 5 is a block diagram of another system for preserving routable IP addresses using ARP proxy, according to another embodiment of the invention.
Figure 6:
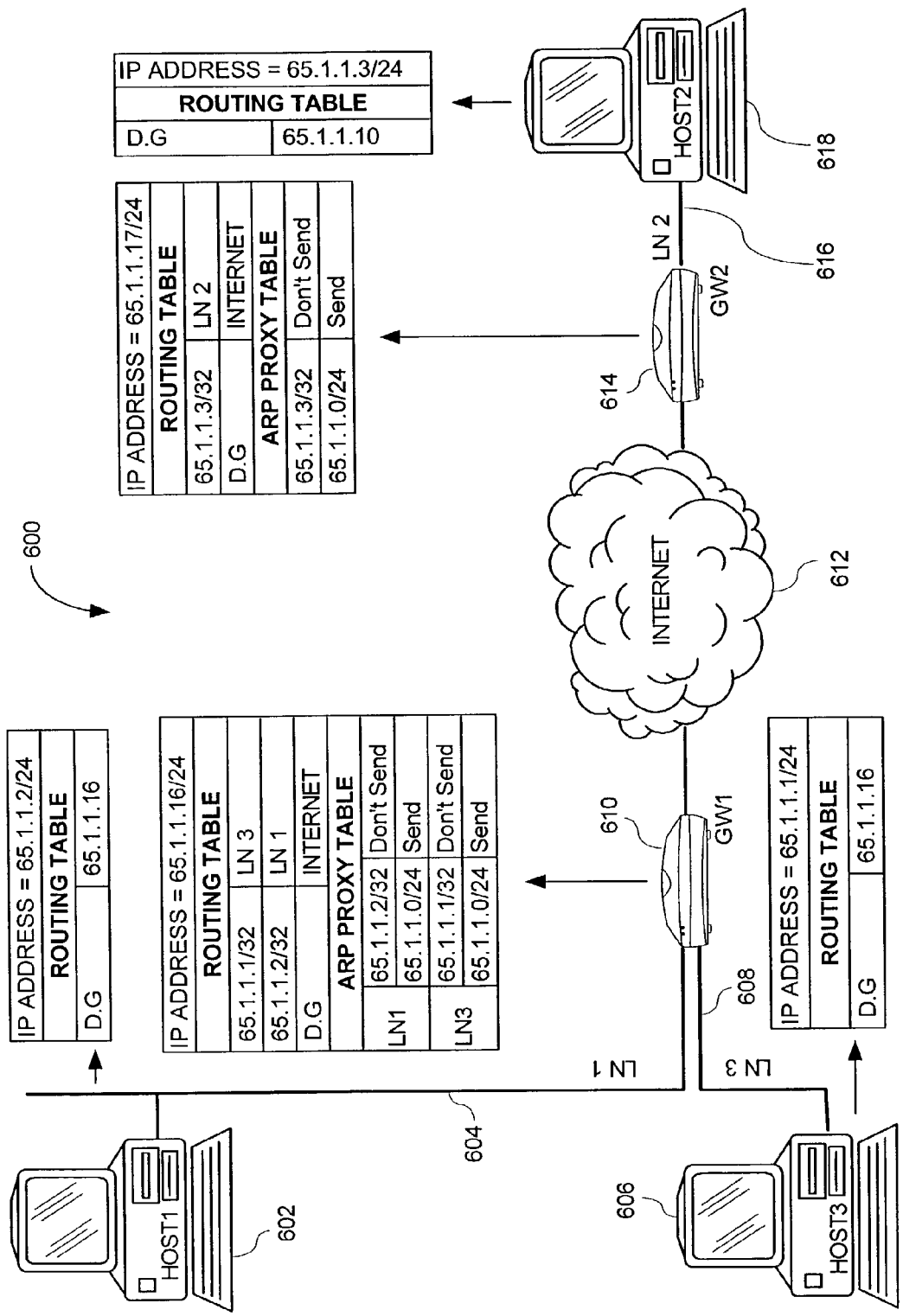
FIG. 6 is a block diagram of yet another system for preserving routable IP addresses using ARP proxy, according to yet another embodiment of the invention Like reference numerals refer to corresponding parts throughout the several views of the drawings. Furthermore, the first number/s of any reference numeral generally indicates the number of the figure where the reference numeral can be found. For example, 112 can be found in FIG. 1, and 618 can be found in FIG. 6.

The routing procedures 320 use the routing table 322 to determine where to send IP packets. The routing table 322 preferably contains multiple entries, each having a destination IP address (and subnet mask) and an associated port 306(1)-(N) where to send a packet addressed to the destination IP address, as shown in FIGS. 2, 5, or 6. For example, if the gateway receives a packet addressed to an IP address on its local network, the routing table 322 instructs the gateway to send the packet to the local network. Alternatively, if a packet is received addressed to any other IP address not on the gateway's local network, then the routing table 322 instructs the gateway to send the packet to the gateway's Default Gateway (D.G.), which is typically the Internet. A more detailed description of the use of the above procedure and table can be found below in relation to FIG. 4.

The ARP procedures 324 use the ARP proxy table 326 to determine whether or not to publish the gateway's local network address 328. The ARP proxy table 326 preferably contains multiple entries, each having a destination IP address (and subnet mask) and an associated instruction whether or not to publish gateway's local network address (MAC address) 328, as shown in FIGS. 2, 5, or 6. For example, if the gateway receives an ARP request having any destination IP address within the ISP's network, then the gateway publishes its own local network address (MAC address) 328 back to the local network address (MAC address) of the host from where the ARP request came. However, if the ARP request has a destination IP address of a host within its local network, then the gateway does not publish its own local network address (MAC address). A more detailed description of the use of the above procedure and table can be found below in relation to FIG. 4.

Figure 4A:
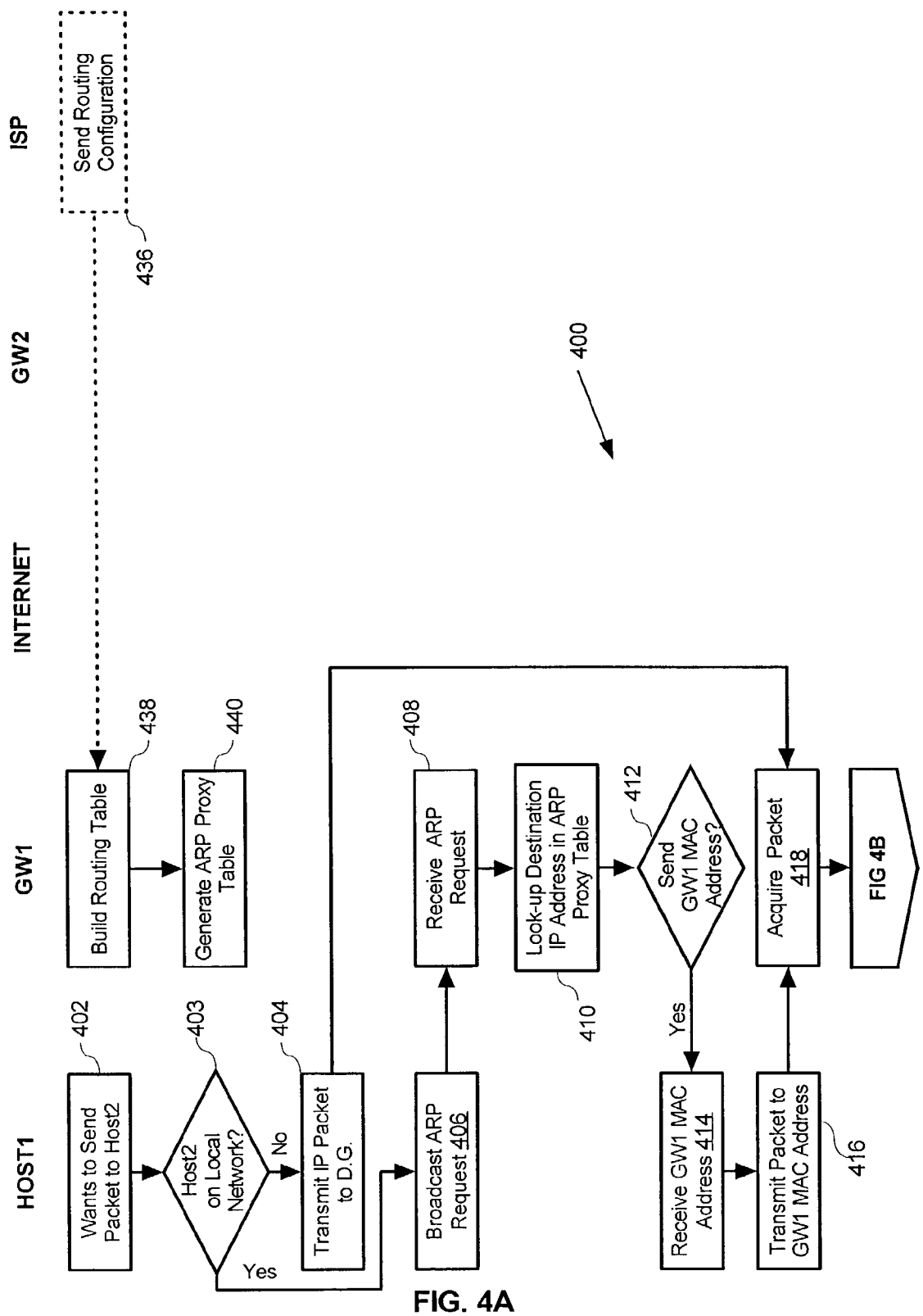
FIG. 4 is a flow chart of a method for preserving routable IP addresses using ARP proxy, according to an embodiment of the invention.
Figure 4B:
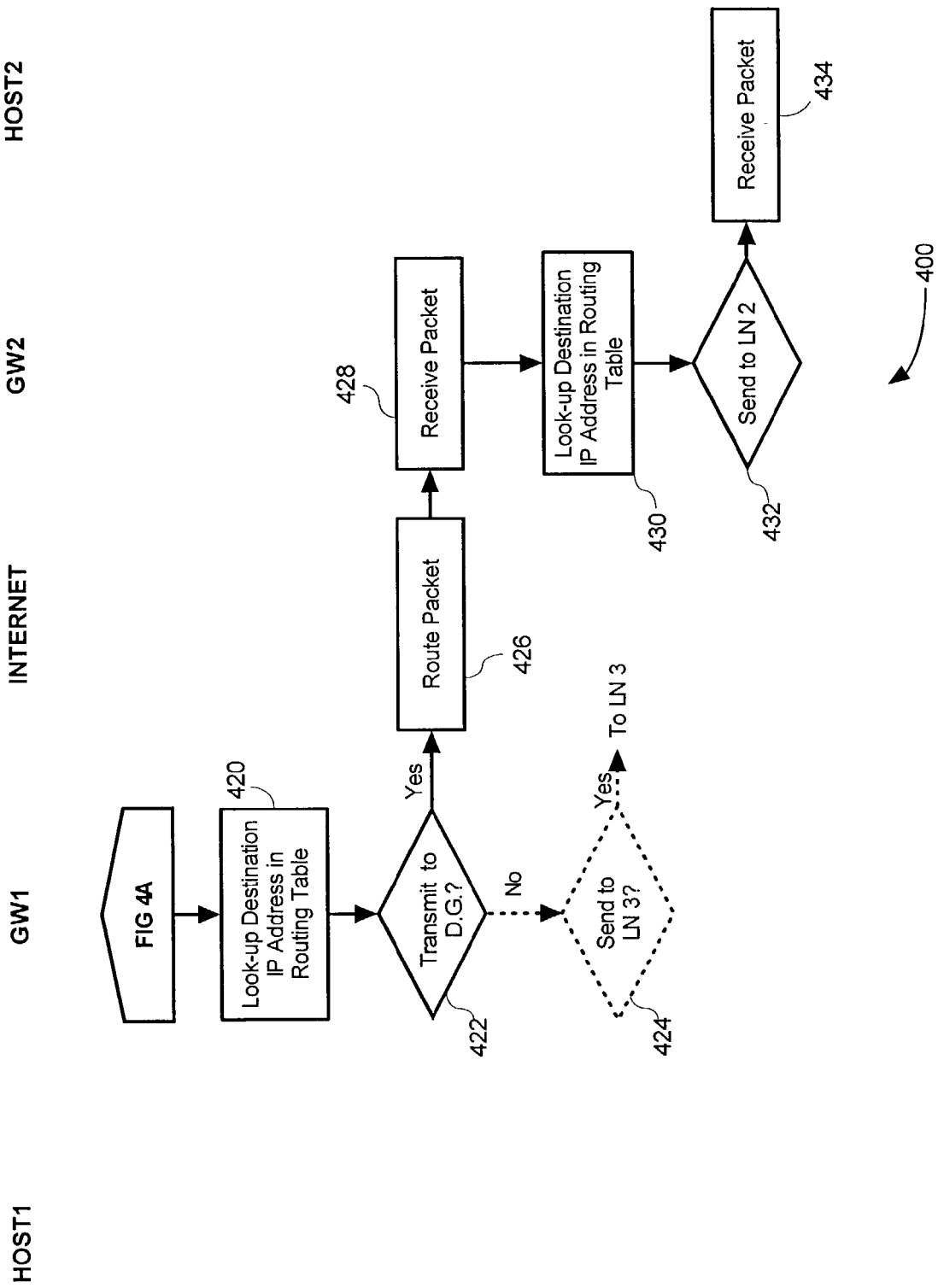

FIG. 4 is a flow chart of a method 400 for preserving routable IP addresses using ARP proxy, according to an embodiment of the invention. For ease of explanation of the method 400, an example of communicating a packet in system 200 (FIG. 2) will now be described. It should, however, be appreciated that the example is used merely to aid in the explanation, and that the method 400 applies equally as well to FIGS. 5 and 6. Reference numerals used in this example refer to both FIGS. 2 and 4.

Each gateway that runs TCP/IP makes routing decisions. These decisions are controlled by the routing table 322 (FIG. 3) on each gateway. In a preferred embodiment, the routing table is built automatically, based on the current TCP/IP configuration of the gateway. The gateway uses the default route if no other host or network route matches the destination address included in an IP packet. The default route typically forwards an IP datagram (for which there is no matching or explicit local route) to a Default Gateway address for a router on the local subnet. Because the router that corresponds to the Default Gateway contains information about the network IDs of the other IP subnets within the larger TCP/IP Internet, it forwards the packet to other routers until the packet is eventually delivered to a gateway that is connected to the specified destination host or subnet within the larger network.

In one embodiment, an ISP sends 436 routing configuration data to the gateways 206 and 212 (FIG. 2). This routing data is used to build a routing table 322 (FIG. 3) on each gateway. For example, the ISP may send routing configuration data to the gateways each time that a customer couples a new host or local network to a gateway. Alternatively, the routing table 322 (FIG. 3) is built 438 automatically, each time a new host or local network is coupled to a gateway. In yet another embodiment, the routing table, including a Default Gateway address, may be entered manually into each gateway.

Once the routing table has been built 438, the ARP proxy table 326 (FIG. 3) is automatically generated 440 from the routing table 322 (FIG. 3). To accomplish this, the ARP proxy table is setup with distinct sub-tables for each local network coupled to the gateway. For each sub-table or local network, an IP address for each host coupled to that local network is provided. A corresponding instruction not to send the gateway's local network address is provided for each local host IP address. An instruction to send the gateway's local network address is provided for all other IP addresses.

The first host 202 having an IP address and subnet mask of 64.1.1.1/24 wants 402 to transmit a packet to the second host 216 having an IP address and subnet mask of 64.1.1.2/24. The first host 202 then determines 403 whether the destination IP address is on its network. In other words, whether the second IP address (destination IP address) of the second host is on the same sub-network or local network as the first IP address (source IP address) of the first host.

If the first IP address (source IP address) of the first host is not on the same sub-network or local network as the second IP address (destination IP address) of the second host (403-No), then the first host determines from its routing table to send the packet to the first host's Default Gateway, whereafter the IP packet is transmitted 404 to the first hosts Default Gateway, which in this case is the IP address of the first gateway 206.

However, if the first IP address (source IP address) of the first host is on the same sub-network or local network as the second IP address (destination IP address) of the second host (403-Yes), the first host broadcasts 406 an ARP request. In other words, although in reality the first host 202 is on a completely different local network to the second host 216, the first host 202 assumes (403-Yes) that the second host 216 is on its own first local network 204. This is because the first host 202 and the second host have been assigned IP addresses that appear to be on the same sub-network or local network, i.e., 64.1.1.1/24 and 64.1.1.2/24, where /24 includes 256 unique IP addresses in the same network.

Because the first host 202 assumes that the second host 216 is on its first local network 204, it attempts to send the packet to the second host 216 over the first local network 204. Communication over a local network occurs using the datalink or Media Access Control (MAC) layer of the International Organization for Standardization's (ISO) Open System Interconnection (OSI) model. The datalink or MAC layer is a protocol that controls access to the physical transmission medium on a local network. MAC layer functionality is built into the communications circuitry and includes a unique local network address that identifies each network card attached to the network. The common MAC layer standard used in Ethernet is the Carrier Sense Multiple Access/Collision Detection (CSMA/CD) architecture.

To communicate within the first local network 204, a source host must first ascertain the local network address, typically the MAC address, of the destination host. ARP is used to obtain the local network address of the destination host from its known IP address, and is extensively used by all hosts in an Ethernet network. Therefore, to ascertain the local network address of the second host 216 from the second host's known IP address, the first host 202 broadcasts 406 an ARP request onto the first local network 204 (LN 1). The ARP request includes a source IP address (64.1.1.1) and source local network address of the first host and a destination IP address (64.1.1.2) of the second host. Each device coupled to the first local network 204 receives this ARP request. Further details of ARP requests can be found in RFC 826, which is hereby incorporated by reference.

Normally, the host with the specified destination IP address, sends an ARP reply packet to the originating host with its destination local network address. However, as the second host 216 is not directly coupled to the first local network 204, it does not receive the ARP request and, therefore, cannot reply with its local network address. Rather, the first gateway 206 receives 408 the ARP request and looks-up 410 the destination IP address in its own ARP proxy table 326 (FIG. 3).

Using the ARP proxy table 326 (FIG. 3) shown in FIG. 2, the ARP procedures 324 (FIG. 3) then determine 412 whether or not to send the first gateway's local network address back to the host that made the ARP request. The ARP proxy table on the first gateway instructs the first gateway to send its local network address back to the host that made the ARP request. This is the case for all destination IP addresses, except for the destination IP addresses of any hosts coupled directly to the first local network. Stated differently, the ARP proxy table will not instruct the first gateway to send back its local network address if the destination IP address in the ARP request is a host coupled directly to the first local network 204. For example, if the destination IP address is 64.1.1.1/32, the first gateway 206 will not send its local network address back to the first host 202. However, if the destination IP address is 64.1.1.0/24, i.e., is any other host on the network except the first host 202 (64.1.1.1/32), then the first gateway 206 will send its local network address back to the first host 202.

If it is determined from the ARP proxy table that the first gateway's local network address must be sent (412-Yes), then the first gateway 206 sends its local network address back to the host that made the ARP request, i.e., back to the first host 202. If, however, it is determined from the ARP proxy table that the first gateway's local network address must not be sent (412-No), then the first gateway does not send its local network address back to the host that made the ARP request.

The first host 202 receives 414 the first gateway's local network address, and thereafter transmits 416 the packet back to the local network address of the first gateway 206. The packet includes a header containing at least a source IP address of the first host 202, i.e., 64.1.1.1, and a destination IP address of the second host 216, i.e., 64.1.1.2. The first host 202 then updates its ARP table so that it will send all future packets addressed to the second host's IP address, to the first gateway's local network address.

The first gateway receives 418 the packet and looks-up 420 the destination IP address in its routing table 322 (FIG. 3) using the routing procedures 320 (FIG. 3). From the routing table and the destination IP address, the routing procedures 320 (FIG. 3) determine which port to send the packet to. In general, as can be seen from the first gateway's routing table in FIG. 2, the routing table will instruct the first gateway 206 to send all packets with a destination IP address of a host directly coupled to the first local network 204, to the gateway's first local network 204. Also, the routing table will instruct the first gateway 206 to send all packets with a destination IP address of a host not directly coupled to the first local network 204, to the gateway's Default Gateway, which in this case is the Internet 210. In other words, all destination IP addresses, except for the destination IP addresses of any hosts coupled to the first local network, will be sent to the Default Gateway.

If it is determined from the routing table to send the packet to the first gateway's Default Gateway (D.G.) (422-Yes), then the packet is sent to the Default Gateway, which in this case is the Internet. If it is determined from the routing table not to send the packet to the first gateway's Default Gateway (D.G.) (422-No), then the packet is sent elsewhere as explained in further detail below in relation to FIG. 6.

If the packet is sent to the first gateway's Default Gateway, then the packet is routed 426 through the Internet to the second gateway 212. The second gateway 212 receives 428 the packet and looks-up 430 the destination IP address in its routing table. The routing procedures on the second gateway then determine which port 306(1)-(N) (FIG. 3) to send the packet to. This means that with a destination address of 64.1.1.2/32 (432-Yes), the second gateway's routing table instructs the second gateway to send the packet to the second local network 214 (LN 2). The packet is then received 434 by the second host 216. Similarly, a packet sent from the second host 216 to the first host 202 will follow similar processes to those described above.

In this way, routable IP addresses on the same network can be assigned to hosts and gateways on separate and distinct local networks, thereby preserving IP addresses and reducing waste.

FIG. 5 is a block diagram of another system 500 for preserving routable IP addresses using ARP proxy, according to another embodiment of the invention. In this embodiment, a first host 502 and a third host 504 are both coupled to the same first local network 506 (LN 1) which is coupled to a first gateway 508. The first gateway 508 is coupled to the Internet 510. A second host 516 is coupled to a second gateway 512 via a second local network 514 (LN 2). The second gateway 512 is also coupled to the Internet 510.

If the first host 502 or the third host 504 desires to send a packet to the second host 516, the packet is communicated as described above in relation to FIG. 4. For example, the first host 502 having an IP address (and subnet mask) of 64.1.1.1/24 wants to send a packet to the second host having an IP address (and subnet mask) of 64.1.1.3/24. Because of their IP addresses and subnet masks, the first host 502 assumes that the second host 516 is on the first local network 506 (LN 1). Therefore, the first host broadcasts an ARP request containing its local network address, its source IP address, and the destination IP address of the second host 516. As the second host 516 is not directly coupled to the first local network 506 it does not receive the ARP request. The first gateway 508, however, receives the ARP request and looks-up the destination IP address in its ARP proxy table.

The first gateway's ARP proxy table instructs the first gateway 508 to send the first gateway's local network address to the first host. In fact, the ARP proxy table will instruct the gateway to send its local network address for all destination IP addresses except for the destination IP addresses of any hosts coupled directly to the first local network 506, i.e., except for the first and third hosts 502 and 504, respectively.

The first host 502 receives the local network address of the first gateway, and sends the packet to that local network address. The packet's header includes the destination IP address of the second host 516, ie., 64.1.1.3/24. The gateway receives the packet, and looks-up the destination IP address in its routing table. The routing table instructs the first gateway to send the packet to its Default Gateway, i.e., the Internet 510.

The packet is routed through the Internet to the second gateway. The second gateway receives the packet and looks-up the destination IP address in its routing table. The destination IP address, i.e., 64.1.1.3/32, is the IP address of a host directly coupled to the second local network 514, therefore, the routing table instructs the second gateway 512 to send the packet to the second local network 514 (LN 2). The packet is shortly thereafter received by the second host. Packets sent from the third host to the second host, or from the second host to either of the first or third hosts, are sent in a similar manner.

However, packets sent from the first host to the third host, or visa versa, are sent using the standard ARP mechanisms. For example, for a packet sent from the third host 504 to the first host 502, the third host 504 assumes that the first host is on its same local network 506. In this case, this assumption is correct, as the first host is on its same local network 506. The third host 504 broadcasts an ARP request onto the first local network 506. The ARP request is received by both the first host 502 and the first gateway 508. The first gateway looks up the destination IP address, i.e., 64.1.1.1/24, in its ARP proxy table and ascertains that it must not send out its local network address. This is the case whenever the destination IP address is an IP address of any host on the first local network 506.

The first host 502 also receives the ARP request and looks up in its ARP table whether or not to respond by sending its own local network address. As the destination IP address is the IP address of the first host 502, it responds by sending its own local network address (MAC address) back to the third host 504. The first and third hosts then update their ARP tables for future communication between one another. The third host 504 then sends the packet to the first host's local network address, whereafter the first host receives the packet. The first host 502 sends packets to the third host 504 in a similar manner.

FIG. 6 is a block diagram of yet another system 600 for preserving routable IP addresses using ARP proxy, according to yet another embodiment of the invention. In this embodiment, a first host 602 is coupled to a first gateway 610 via a first local network 604 (LN 1). A third host 606 is coupled to the first gateway 610 via a third local network 608 (LN 3). Each of the first and third local networks preferably attach to one of the first gateway's ports 306(1)-(N) (FIG. 3). The first gateway 610 is coupled to the Internet 612. In addition, a second host 618 is coupled to a second gateway 614 via a second local network 616 (LN 2). The second gateway 614 is also coupled to the Internet 612.

Communication between the first host 602 or the third host 606, and the second host 618 occurs in a similar manner to that described above in relation to FIGS. 2, 4, and 5. The only difference being that the ARP proxy table on the first gateway 610 includes a sub-table for each of the first and third local networks, 604 (LN 1) and 608 (LN 3) respectively.

For ease of explanation, reference will again be made to FIG. 4, this time in conjunction with FIG. 6. As the first host 602 and the third host 606 are on different local networks, communication between the first and third hosts is more complex than that described above in relation to FIG. 5. For example, the first host 602 having an IP address (and subnet mask) of 65.1.1.2/24 wants to send a packet to the third host having an IP address (and subnet mask) of 65.1.1.1/24. Because of their IP addresses and subnet masks, the first host 602 assumes that the third host 606 is on the first local network 604 (LN 1). Therefore, the first host broadcasts 406 (FIG. 4) an ARP request containing its local network address, its source IP address, and the destination IP address of the third host 604. As the third host 604 is not directly coupled to the first local network 604 it does not receive the ARP request. The first gateway 610, however, receives the ARP request and looks-up the destination IP address in its ARP proxy table.

The ARP proxy table includes a sub-table for each local network connected to it, i.e., first local network 604 (LN 1) and third local network 608 (LN 3). Therefore, the ARP procedures 324 (FIG. 3) on the first gateway look-up 410 (FIG. 4) the destination IP address for the local network from where the ARP request came, i.e., the third local network. Looking-up the destination IP address of 65.1.1.1/25 reveals that the first gateway 610 must send (412-Yes) (FIG. 4) its local network address to the first host 602. The first host 602 receives 414 (FIG. 4) the local network address of the first gateway 610 and transmits 416 (FIG. 4) the packet to the first gateway's local network address.

The first gateway 610 receives 418 (FIG. 4) the packet and looks-up 420 (FIG. 4) where to send the packet in its routing table. The packet's header contains the source IP address of the first host 602, the destination IP address of the third host, and the local network address of the first gateway. The routing table instructs the first gateway 610 to send the packet to the third local network 608 (LN 3), whereafter the gateway sends (424-Yes) (FIG. 4) the packet to the third local network 608 (LN 3). The third host 606 then receives the packet from the third local network 608. Packets sent from the third host to the first host occur in a similar manner.

In this way, routable IP addresses on the same network can be assigned to hosts and gateways on separate and distinct local networks, thereby preserving IP addresses and reducing waste. Therefore, a single routable IP address can be given to each host and gateway without having to assign a minimum of four routable IP addresses to each local network.

The ARP proxy table and routing table on each gateway is remotely updated by an ISP (not shown) whenever a new host is added to the local network that is coupled to the gateway.

While the foregoing description and drawings represent preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. For example, use of particular IP addresses in the description is merely exemplary. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method for preserving Internet Protocol (IP) addresses, comprising:

communicating routing data to a first gateway to form a routing table through the Internet;

generating an Address Resolution Protocol (ARP) proxy table from the routing table at the first gateway;

receiving at the first gateway coupled to a first local network an Address Resolution Protocol request from a first host also coupled to said first local network, where said ARP request includes a destination IP address of a second host coupled to a second gateway and a second local network, said first gateway and the second gateway in communication through the Internet, and where a source IP address of said first host and said destination IP address are within a common IP address sub-network;

sending a local network address of said first gateway to said first host in reply to said ARP request, based on an entry for said destination IP address in the ARP proxy table stored on said first gateway;

directing a packet from said first host using the local network address, addressed to said second host, where said packet includes said source IP address and said destination IP address; and transmitting said packet toward said second host from the first gateway through the Internet and the second gateway.

2. The method of claim 1, further comprising, before said sending, determining that said destination IP address is on a common IP address sub-network to said source IP address.

3. The method of claim 1, wherein transmitting comprises transmitting said packet toward said second host from the first gateway through the Internet and the second gateway or sending said packet to a Default Gateway of said first gateway, based on an entry for said destination IP address in a routing table stored on said first gateway.

4. The method of claim 3, wherein communicating routing data comprises communicating routing data to the first gateway from an ISP.

5. The method of claim 1, wherein transmitting comprises transmitting said packet toward said second host from the first gateway through the Internet and the second gateway, sending said packet to a Default Gateway of said gateway first gateway, or sending said packet to a third host coupled to a third local network, based on an entry for said destination IP address in a routing table stored on said first gateway, where said gateway is also coupled to said third local network, and where said source IP address and said destination IP address are within the same IP address sub-network.

6. The method of claim 1, further comprising, before sending, looking-up said destination IP address in said ARP proxy table.

7. The method of claim 1, further comprising, before said transmitting, looking-up said destination IP address in said routing table.

8. The method of claim 1, wherein generating comprises: setting tip a distinct sub-table for each local network coupled to said first gateway; providing an IP address for each host coupled to each local network; creating, for each IP address, a corresponding instruction not to send said local network address of said first gateway in reply to an ARP request; and generating, for all other IP addresses, an instruction to send said local network address of said gateway in reply to an ARP request.

9. A method for preserving Internet Protocol (IP) addresses, comprising:

receiving at a first gateway coupled to a first local network an Address Resolution Protocol (ARP) request from a first host also coupled to said first local network, where said ARP request includes a destination Internet Protocol (IP) address of a second host coupled to a second local network also coupled to said first gateway, said second host in communication with a second gateway that is in communication with the first gateway through the Internet, and where a source IP address of said first host and said destination IP address are within the same IP address sub-network;

sending a local network address of said first gateway to said first host in reply to said ARP request, based on an entry for said destination IP address in an ARP proxy table stored on said gateway;

receiving a packet from said first host addressed to said second host, where said packet includes said source IP address and said destination IP address; and transmitting said packet toward said second local network for receipt by said second host through the second gateway.

10. The method of claim 9, further comprising, before said sending, looking-up said destination IP address in said ARP proxy table.

11. The method of claim 9, further comprising, before said transmitting, looking-up said destination IP address in said routing table.

12. The method of claim 9, further comprising, before said receiving, remotely updating said ARP proxy table and said routing table on said first gateway whenever a new host is added to said first local network.

13. A gateway for preserving Internet Protocol (IP) addresses, comprising:
   a Central Processing Unit (CPU);
   communications circuitry coupled to a first local network and the Internet, where said communications circuitry has a unique local network address;
   at least two ports for communicating with said first local network and the Internet;
   a memory, comprising:
      an operating system;
      an Address Resolution Protocol (ARP) table containing a list of destination IP addresses and associated instructions for sending said local network address to a first host also coupled to said first local network, where said first host has a source IP address;
      a routing table containing a list of destination IP addresses and associated instructions for routing packets to one of said ports; communication procedures comprising:
      instructions for receiving routing data through the Internet and forming the routing table;
      instructions for generating the Address Resolution Protocol (ARP) proxy table from the routing table;
      instructions for receiving an ARP request from said first host, where said ARP request includes a destination IP address of a second host coupled to a second local network having a second gateway in communication with the gateway through the Internet, and where said source IP address and said destination IP address are within the same IP address sub-network;
      instructions for sending said local network address to said first host in reply to said ARP request, based on an entry for said destination IP address in said ARP proxy table;
      instructions for directing a packet from said first host using the local network address addressed to said second host, where said packet includes said source IP address and said destination IP address; and
      instructions for transmitting said packet toward said second host.

14. The gateway of claim 13, wherein said instructions for transmitting further comprise instructions for sending said packet to a Default Gateway of said gateway based on a entry for said destination IP address in said routing table.

15. The gateway of claim 14, wherein instructions for sending further comprise instructions for transmitting said packet to the Internet.

16. The gateway of claim 13, wherein said instructions for transmitting further comprises instructions for sending said packet to a third host coupled to a third local network based on a entry for said destination IP address in said routing table, where said gateway is also coupled to said third local network, and where said source IP address and said destination IP address are within the same IP address sub-network.

17. The gateway of claim 13, wherein said memory further comprises ARP procedures for looking-up said destination IP address in said ARP proxy table.

18. The gateway of claim 13, wherein said memory further comprises routing procedures for looking-up said destination IP address in said routing table.

19. The gateway of claim 13, wherein said memory further comprises instructions for remotely updating said ARP proxy table and said routing table on said gateway whenever a new host is added to said first local network.

20. A system for preserving Internet Protocol (IP) addresses, comprising:
   a first host having a source IP address and coupled to a first gateway via a first local network;
   a second host having a destination IP address and coupled to a second gateway via a second local network;
   the Internet coupled to both said first gateway and said second gateway, where said first gateway comprises:
      a Central Processing Unit (CPU);
      communications circuitry coupled to a first local network and the Internet, where said communications circuitry has a unique local network address;
      at least two ports for communicating with said first local network and the Internet;
      a memory, comprising:
         an operating system;
      an Address Resolution Protocol (ARP) table containing a list of destination IP addresses and associated instructions for sending said local network address to a first host also coupled to said first local network, where said first host has a source IP address;
         a routing table containing a list of destination IP addresses and associated instructions for routing packets to one of said ports;
         communication procedures comprising:
         instructions for receiving routing data through the Internet and forming the routing table;
         instructions for generating the Address Resolution Protocol (ARP) proxy table from the routing table;
         instructions for receiving an ARP request from said first host, where said ARP request includes a destination IP address of a second host coupled to a second local network, and where said source IP address and said destination IP address are within the same IP address sub-network;
         instructions for sending said local network address to said first host in reply to said ARP request, based on an entry for said destination IP address in said ARP proxy table;
         instructions for directing a packet from said first host using the local network address addressed to said second host, where said packet includes said source IP address and said destination IP address; and
         instructions for transmitting said packet toward said second host.

21. A computer program product for preserving Internet Protocol (IP) addresses, the computer program product comprising a computer readable storage encoded with instructions capable of being executed by a computer comprising:

instructions for receiving routing data at the first gateway through the Internet and forming the routing table;

instructions for generating the Address Resolution Protocol (ARP) proxy table from the routing table;

instructions for receiving at the first gateway coupled to a first local network an Address Resolution Protocol (ARP) request from a first host also coupled to said first local network, where said ARP request includes a destination IP address of a second host coupled to a second local network, said first gateway and the second gateway in communication through the Internet and where a source IP address of said first host and said destination IP address are within the same IP address sub-network;

instructions for sending a local network address of said gateway to said first host in reply to said ARP request, based on an entry for said destination IP address in an ARP proxy table stored on said gateway;

instructions for directing a packet from said first host using the local network address addressed to said second host, where said packet includes said source IP address and said destination IP address; and instructions for transmitting said packet toward said second host.

* * * * *